(12) United States Patent
Liu et al.

(10) Patent No.: US 10,013,594 B2
(45) Date of Patent: Jul. 3, 2018

(54) FINGERPRINT IDENTIFICATION DEVICE, TOUCH PANEL AND DISPLAY DEVICE

(71) Applicants: BOE TECHNOLOGY GROUP CO., LTD., Beijng (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaoliang Ding, Beijing (CN); Weijie Zhao, Beijing (CN); Shengji Yang, Beijing (CN); Hongjuan Liu, Beijing (CN); Changfeng Li, Beijing (CN); Wei Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 15/023,587

(22) PCT Filed: Sep. 29, 2015

(86) PCT No.: PCT/CN2015/091021
§ 371 (c)(1),
(2) Date: Mar. 21, 2016

(87) PCT Pub. No.: WO2016/188004
PCT Pub. Date: Dec. 1, 2016

(65) Prior Publication Data
US 2017/0161537 A1   Jun. 8, 2017

(30) Foreign Application Priority Data
May 22, 2015  (CN) .......................... 2015 1 0266624

(51) Int. Cl.
*G06K 9/00* (2006.01)
*G06F 3/044* (2006.01)
*G06F 3/041* (2006.01)

(52) U.S. Cl.
CPC ........... *G06K 9/0002* (2013.01); *G06F 3/044* (2013.01); *G06F 3/0416* (2013.01)

(58) Field of Classification Search
CPC ...... G06K 9/0002; G06F 3/0416; G06F 3/044
See application file for complete search history.

(56) References Cited

U.S. PATENT DOCUMENTS

| 2012/0182253 A1* | 7/2012 | Brosnan | ................. G06F 3/0416 345/174 |
| 2014/0092023 A1* | 4/2014 | Lo | ........................... G06F 3/041 345/173 |

(Continued)

FOREIGN PATENT DOCUMENTS

| CN | 103927468 A | 7/2014 |
| CN | 104050465 A | * 9/2014 |

(Continued)

OTHER PUBLICATIONS

First Office Action regarding Chinese Application No. 201510266624.2, dated Jun. 2, 2017. Translation provided by Dragon Intellectual Property Law Firm.

(Continued)

*Primary Examiner* — Jonathan S Lee
(74) *Attorney, Agent, or Firm* — Harness, Dickey & Pierce, P.L.C.

(57) ABSTRACT

The present disclosure provides a fingerprint identification device, a touch panel and a display device. The fingerprint identification device includes a plurality of first driving lines extending in a first predetermined direction and a plurality of first sensing lines extending in a second predetermined direction that is not parallel to the first predetermined (Continued)

direction. The first sensing lines are divided into at least two sensing groups in the first predetermined direction, each sensing group includes a plurality of sensing sub-groups arranged side by side in the second predetermined direction, each sensing sub-group includes at least one of the first sensing lines, and the adjacent sensing sub-groups are insulated from each other.

20 Claims, 2 Drawing Sheets

(56) References Cited

U.S. PATENT DOCUMENTS

| | | | |
|---|---|---|---|
| 2014/0232950 A1* | 8/2014 | Park | G06F 3/044 |
| | | | 349/12 |
| 2014/0313169 A1* | 10/2014 | Kravets | G06F 3/044 |
| | | | 345/178 |
| 2014/0320767 A1* | 10/2014 | Xu | G06F 3/0412 |
| | | | 349/12 |
| 2014/0333570 A1* | 11/2014 | Lesonen | G06F 3/044 |
| | | | 345/174 |
| 2014/0368755 A1* | 12/2014 | Chen | G06F 3/044 |
| | | | 349/12 |
| 2015/0324031 A1* | 11/2015 | Jeon | G06F 3/044 |
| | | | 345/174 |
| 2015/0331508 A1* | 11/2015 | Nho | G06F 3/0421 |
| | | | 345/173 |
| 2016/0342253 A1* | 11/2016 | Sun | G06F 3/044 |
| 2017/0147850 A1* | 5/2017 | Liu | G06K 9/0002 |
| 2017/0160867 A1* | 6/2017 | Zhu | G06F 3/0416 |
| 2017/0161537 A1 | 6/2017 | Liu et al. | |
| 2017/0277292 A1* | 9/2017 | Park | G06F 3/044 |

FOREIGN PATENT DOCUMENTS

| | | | |
|---|---|---|---|
| CN | 104050465 A | | 9/2014 |
| CN | 104376299 A | * | 2/2015 |
| CN | 104376299 A | | 2/2015 |
| CN | 104834426 A | | 8/2015 |

OTHER PUBLICATIONS

Written Opinion of the International Searching Authority and International Search Report regarding International Application No. PCT/CN2015/091021, dated Jan. 20, 2016. Translation provided by Dragon Intellectual Property Law Firm.

* cited by examiner

FINGERPRINT IDENTIFICATION DEVICE, TOUCH PANEL AND DISPLAY DEVICE

CROSS-REFERENCE TO RELATED APPLICATION

The present application is the U.S. national phase of PCT Application No. PCT/CN2015/091021 filed on Sep. 29, 2015, which claims a priority of the Chinese patent application No. 201510266624.2 filed on May 22, 2015, which is incorporated herein by reference in its entirety.

TECHNICAL FIELD

The present disclosure relates to the field of touch technology, in particular to a fingerprint identification device, a touch panel including the fingerprint identification device and a display device including the touch panel.

BACKGROUND

Currently, a fingerprint touch function is mainly achieved by a capacitive touch-sensing technology, which includes a press-type technology and a slide-type technology. As compared with a press-type sensor with a large surface area, a slide-type sensor has such advantages as small surface area, small size and low power consumption.

When a fingerprint is to be collected by the slide-type sensor, a region which a finger moves across is sampled at a relatively high sampling rate to obtain a set of fingerprint data, and then the fingerprint data are spliced together to form a complete fingerprint image. In the related art, the collection of the fingerprint data is cumbersome, and the data needs to be collected many times so as to obtain the fingerprint image. As a result, the collection of the fingerprint data is time-consuming and expensive.

SUMMARY

An object of the present disclosure is to provide a fingerprint identification device, a touch panel and a display device, so as to reduce the time desired for fingerprint detection.

In one aspect, the present disclosure provides in some embodiments a fingerprint identification device, including a plurality of first driving lines extending in a first predetermined direction and a plurality of first sensing lines extending in a second predetermined direction that is not parallel to the first predetermined direction. The first sensing lines are divided into at least two sensing groups in the first predetermined direction, each sensing group includes a plurality of sensing sub-groups arranged side by side in the second predetermined direction, each sensing sub-group includes at least one of the first sensing lines, and the adjacent sensing sub-groups are insulated from each other.

Alternatively, the first predetermined direction is perpendicular to the second predetermined direction.

Alternatively, each sensing sub-group includes two of the first sensing lines forming a differential pair and configured to transmit signals in opposite directions.

Alternatively, the first driving lines are evenly arranged outside the adjacent two sensing groups in the first predetermined direction.

Alternatively, a grounding line is arranged between the adjacent sensing groups and/or between the adjacent sensing sub-groups of each sensing group, and insulated from the first sensing line.

Alternatively, the grounding line includes a first extension portion extending in the first predetermined direction to a position between the adjacent sensing sub-groups of each sensing group, a second extension portion located between the two sensing groups adjacent to each other in the first predetermined direction, extending in the second predetermined direction and intersecting the first extension portion, and a third extension portion located between the two sensing groups adjacent to each other in the first predetermined direction, extending in the first predetermined direction and intersecting the second extension portion.

Alternatively, the fingerprint identification device further includes a first driving integrated circuit (IC) and a first binding region configured to connect the fingerprint identification device to a first flexible circuit board. The first driving lines are electrically connected to the first driving IC, the first driving IC is configured to apply a first driving signal to the first driving lines for the fingerprint identification, the first driving IC is electrically connected to the first binding region, and the first sensing line is electrically connected to the first flexible circuit board through the first binding region.

Alternatively, the fingerprint identification device further includes a first sensing IC electrically connected to the first sensing lines and configured to process sensing signals acquired by the first sensing lines so as to acquire fingerprint data.

Alternatively, the first sensing IC is arranged on the first flexible circuit board.

Alternatively, the first sensing IC is integrated into the first driving IC.

Alternatively, the first sensing line is of a width greater than that of the first driving line.

Alternatively, the first driving line is of a width in the range of 20 μm to 30 μm, the first sensing line is of a width in the range of 30 μm to 35 μm, and the first driving line is spaced apart from the adjacent first sensing line in the first predetermined direction at a distance in the range of 25 μm to 50 μm.

In another aspect, the present disclosure provides in some embodiments a touch panel including the above-mentioned fingerprint identification device.

Alternatively, the fingerprint identification device includes a first substrate, on which first driving lines and first sensing lines are arranged. The first substrate is a portion of a substrate of the touch panel, or the first substrate is arranged on, and electrically connected to, the substrate of the touch panel.

Alternatively, the fingerprint identification device further includes a first driving IC and a first binding region configured to connect the fingerprint identification device to a first flexible circuit board. The first driving lines are electrically connected to the first driving IC, the first driving IC is configured to apply a first driving signal to the first driving lines for the fingerprint identification, the first driving IC is electrically connected to the first binding region, and the first sensing line is electrically connected to the first flexible circuit board through the first binding region. The touch panel includes a second driving IC, a second binding region connected to a second flexible circuit board, a plurality of second driving lines and a plurality of second sensing lines. The second driving lines are electrically connected to the second driving IC, the second driving IC is configured to apply a second driving signal to the second driving lines for touch detection, the second driving IC is electrically connected to the second binding region, and the second sensing lines are electrically connected to the second flexible circuit board through the second binding region.

Alternatively, the first driving IC is arranged independently of the second driving IC and the first binding region is arranged independently of the second binding region, or the first driving IC is integrated into the second driving IC and the first binding region is integrated into the second binding region.

In yet another aspect, the present disclosure provides in some embodiments a display device including the above-mentioned touch panel.

According to the embodiments of the present disclosure, through optimizing the design of the first driving lines and the first sensing lines in the fingerprint identification device, it is able for each of the first driving lines to acquire more fingerprint data during the scanning, thereby to reduce the time desired for the fingerprint detection and perform the fingerprint identification more rapidly.

BRIEF DESCRIPTION OF THE DRAWINGS

The following drawings, as a part of the description, are used to illustrate the present disclosure in conjunction with the embodiments, but shall not be used to limit the scope of the present disclosure.

REFERENCE SIGN LIST

Figure 1:
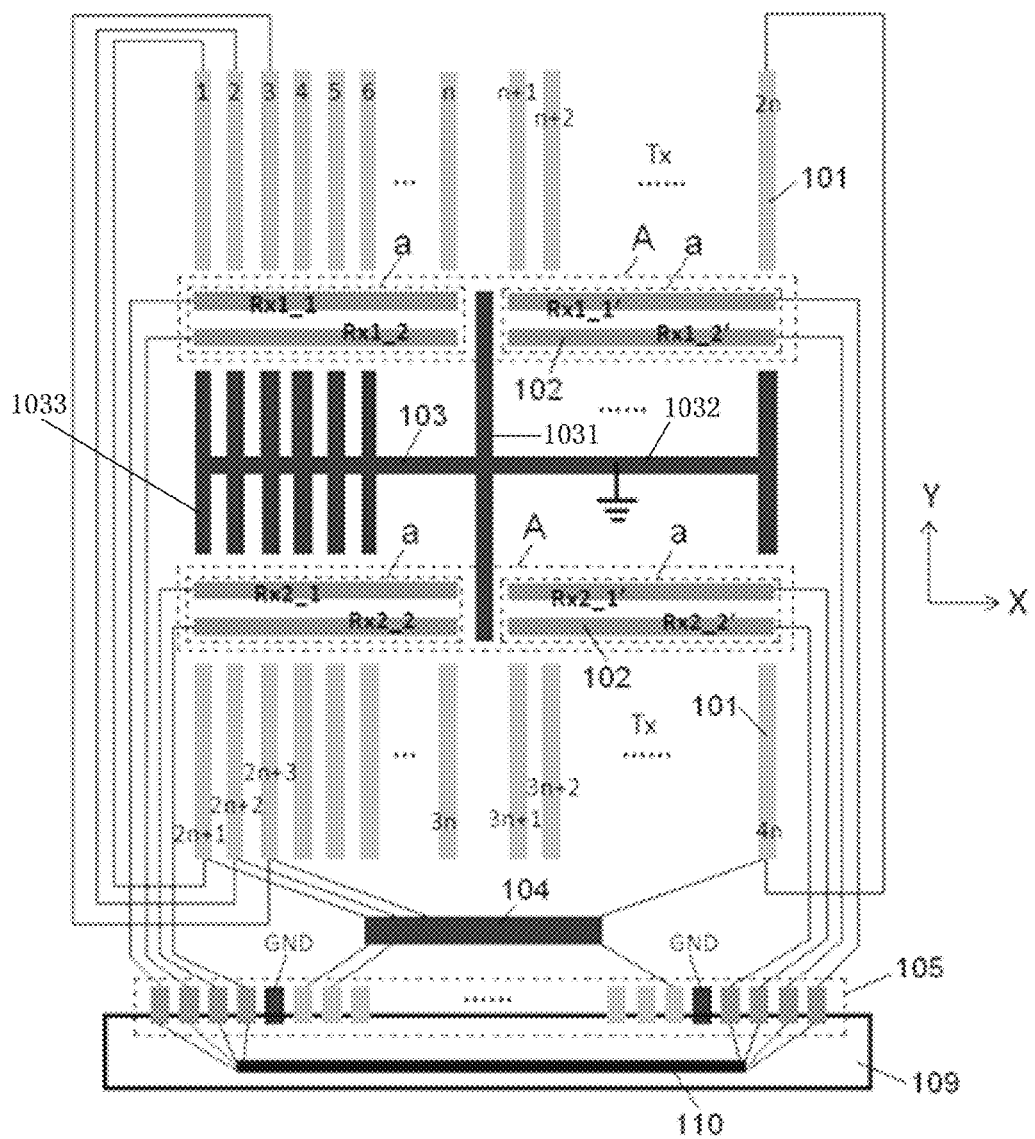
FIG. 1 is a schematic view showing a fingerprint identification device according to some embodiments of the present disclosure.

101 first driving line
102 first sensing line
103 grounding line
104 first driving IC
105 first binding region
106 fingerprint valley
107 fingerprint ridge
108 first substrate
109 first flexible circuit board
110 first sensing IC
1031 first extension portion
1032 second extension portion
1033 third extension portion
201 second driving line
202 second sensing line
204 second driving IC
205 second binding region
A sensing group
a sensing sub-group

DETAILED DESCRIPTION OF THE EMBODIMENTS

The present disclosure will be described hereinafter in conjunction with the drawings and embodiments. It should be appreciated that, the following embodiments are for illustrative purposes only, but shall not be used to limit the present disclosure.

The present disclosure provides in some embodiments a fingerprint identification device which, as shown in FIG. 1, includes a plurality of first driving lines 101 extending in a first predetermined direction and a plurality of first sensing lines 102 extending in a second predetermined direction that is not parallel to the first predetermined direction. The first sensing lines 102 are divided into at least two sensing groups A in the first predetermined direction, each sensing group A includes a plurality of sensing sub-groups a arranged side by side in the second predetermined direction, each sensing sub-group a includes at least one of the first sensing lines 102, and the adjacent sensing sub-groups a are insulated from each other.

It should be appreciated that, in the embodiments of the present disclosure, a direction in which a finger slides is the first predetermined direction. In the related art, each sensing group merely includes one first sensing line extending in the second predetermined direction, and during the scanning of a first driving line Txn, the fingerprint data is merely acquired once. In this regard, it is necessary to collect the data many times and then splice the collected data to form a fingerprint image, so a procedure of the fingerprint identification is cumbersome.

In the embodiments of the present disclosure, the design of the first driving lines 101 and the first sensing lines 102 is optimized, so as to divide each sensing group A into a plurality of sensing sub-groups a, thereby to acquire more fingerprint data during the scanning of each of the first driving lines 101. Hence, it is merely necessary to collect the data fewer times and then splice the collected data to form the fingerprint image. As a result, it is able to effectively reduce the time desired for the fingerprint detection and perform the fingerprint identification more rapidly. In addition, it is able to acquire more fingerprint data within an identical time period, thereby to improve the accuracy of the fingerprint identification.

In order to improve the accuracy and efficiency of the fingerprint detection, alternatively, the first predetermined direction is perpendicular to the first predetermined direction. For example, in FIG. 1, the first predetermined direction refers to a Y-axis direction, the second predetermined direction refers to an X-axis direction, and the finger slides in the Y-axis direction.

Figure 2A:
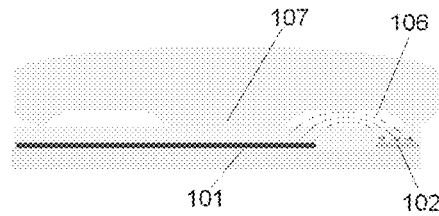
FIGS. 2a-2b are schematic views showing a principle for fingerprint identification according to some embodiments of the present disclosure.
Figure 2B:
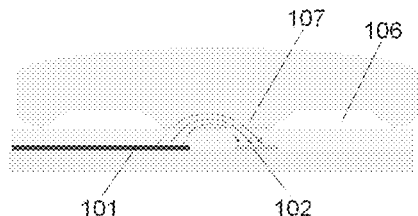

In the embodiments of the present disclosure, the fingerprint identification is performed on the basis of a capacitive sensing mode, and its principle is shown in FIGS. 2a and 2b. When no touch operation is made, an electric field between the first driving line 101 and the first sensing line 102 is of a constant value. When a touch operation has been made by the finger, a part of the electric field lines are absorbed by the finger, so the electric field between the first driving line 101 and the first sensing line 102 is attenuated. In addition, an attenuation degree of the electric field in a case that a fingerprint valley 106 passes through a gap between the first driving line 101 and the first sensing line 102 is different from that in a case that a fingerprint ridge 107 passes through the same gap.

In FIG. 2a, when the fingerprint valley 106 passes through the gap between the first driving line 101 and the first sensing line 102, the electric field may be attenuated to a small degree, so a capacitance generated between the first driving line 101 and the first sensing line 102 is relatively large. In FIG. 2b, when the fingerprint ridge 107 passes through the gap between the first driving line 101 and the first sensing line 102, the electric field may be attenuated to a large degree, so the capacitance generated between the first driving line 101 and the first sensing line 102 is relatively small. By detecting the capacitance variations between the first driving line 101 and the first sensing line 102, it is able to determine whether the fingerprint valley 106 or the fingerprint ridge 107 passes through the gap therebetween, thereby to achieve the fingerprint identification. Further, the acquired fingerprint image is compared with a fingerprint image pre-stored in a database, so as to determine whether or not a touch operation has been made.

In some embodiments of the present disclosure, the first driving lines 101, the first sensing lines 102, and the traces thereof may be directly formed on a glass substrate and made of a material identical to an array substrate. For example, a unit for the fingerprint identification may be manufactured while forming a pixel circuit and an electrode pattern of a display panel, so as to reduce the production cost.

Alternatively, each sensing sub-group a includes two of the first sensing lines 102 forming a differential pair. As shown in FIG. 1, Rx1_1 and Rx1_2 form together a differential pair for signal reception, Rx1_1' and Rx1_2' form together a differential pair for signal reception, Rx2_1 and Rx2_2 form together a differential pair for signal reception, and Rx2_1' and Rx2_2' form together a differential pair for signal reception. Obviously, each sensing group A may further include more sensing sub-groups a arranged in the X-axis direction, so as to further reduce the time desired for the fingerprint detection, and the description thereof is omitted herein.

The so-called differential pair refers to a structure consisting of two first sensing lines 102 via which signals are transmitted in opposite directions, and the detection is performed on the basis of a difference between the signals. Through this design, it is able to reduce an external noise in a better manner, thereby to prevent the detection result from being adversely affected by the external noise and improve the accuracy of the fingerprint identification.

Alternatively, in order to simplify the design and reduce the production cost, the first sensing lines 102 are divided into two sensing groups A in the first predetermined direction (the Y-axis direction in FIG. 1), each sensing group A includes two sensing sub-groups a arranged side by side in the second predetermined direction (the X-axis direction in FIG. 1), and each sensing sub-group a includes two of the first sensing lines 102 forming a differential pair.

The two sensing groups A are provided so as to acquire a movement speed of the finger. As shown in FIG. 1, a time difference between the time when a sensing signal is received by the sensing sub-group consisting of Rx1_1 and Rx1_2 and the time when an identical sensing signal is received by the sensing sub-group consisting of Rx2_1 and Rx2_2 may be determined at first, then a movement speed of the fingerprint may be determined in accordance with a distance between the two sensing sub-groups, and then the fingerprint data collected many times may be spliced in accordance with movement speed, so as to obtain the complete fingerprint image.

Further, grounding lines 103 are arranged between the adjacent sensing groups A and/or between the adjacent sensing sub-groups a of each sensing group A. Each grounding line 103 is insulated from the first sensing line 102 and used to prevent the occurrence of crosstalk between the sensing groups A and between the sensing sub-groups a.

Further, as shown in FIG. 1, the grounding line includes a first extension portion 1031 extending in the first predetermined direction to a position between the adjacent sensing sub-groups a of each sensing group A, a second extension portion 1032 located between the two sensing groups A adjacent to each other in the first predetermined direction, extending in the second predetermined direction and intersecting the first extension portion 1031, and a third extension portion 1033 located between the two sensing groups A adjacent to each other in the first predetermined direction, extending in the first predetermined direction and intersecting the second extension portion 1032.

The pattern of the grounding line 103 is not particularly defined herein, as long as the crosstalk can be effectively avoided.

In order to improve the accuracy and efficiency of the fingerprint detection, as shown in FIG. 1, the first driving lines 101 are evenly arranged outside the adjacent two sensing groups A in the first predetermined direction (i.e., the Y-axis direction). Usually, the first sensing line 102 is of a width greater than that of the first driving line 101, so as to improve the sensitivity of the capacitive detection, thereby to acquire the fingerprint data in a more accurate manner.

Alternatively, the first driving line 101 is of a width within the range of 20 μm to 30 μm. Taking FIG. 1 as an example, a width of the first driving line 101 and a distance between the adjacent first driving lines 101 may be each set as 25 μm, and when a resolution of 508 DPI (dots per inch) is provided, 150 first driving lines 101 may have a total width of 7.5 mm.

Alternatively, the first sensing line 102 is of a width within the range of 30 μm to 35 μm. For example, when the width of the first driving line 101 is 25 μm, the width of the first sensing line 102 may be set as 32 μm. In addition, a distance between the first driving line 101 and the adjacent first sensing line 102 is within the range of 25 μm to 50 μm in the first predetermined direction.

As shown in FIG. 1, the fingerprint identification device may further include a first driving IC 104 and a first binding region 105 configured to connect the fingerprint identification device to a first flexible circuit board 109. The first driving lines 101 are electrically connected to the first driving IC 104, the first driving IC 104 is configured to apply a first driving signal to the first driving lines 101 for the fingerprint identification, the first driving IC 104 is electrically connected to the first binding region 105, and the first sensing line 102 is electrically connected to the first flexible circuit board 109 through the first binding region 105.

Furthermore, the fingerprint identification device further includes a first sensing IC 110 electrically connected to the first sensing lines 102 and configured to process sensing signals acquired by the first sensing lines 102 so as to acquire fingerprint data.

The first sensing IC 110 may be arranged on the first flexible circuit board 109, as shown in FIG. 1. Alternatively, the first sensing IC 110 may also be integrated into the first driving IC 104, and the first sensing lines 102 are directly electrically connected to the first driving IC 104, and the description thereof is omitted herein.

An operational procedure of the fingerprint identification device will be described hereinafter.

When the finger starts to slide from top down in the Y-axis direction, a driving signal is applied to the driving lines Tx1, Tx(n+1), Tx(2n+1) and Tx(3n+1) of the sensing sub-groups a, a signal is received by the sensing lines Rx1 and Rx2 sequentially, and the driving lines Tx2-Txn, Tx(n+2)-Tx2n, Tx(2n+2)-Tx3n and Tx(3n+2)-Tx4n are all grounded. Then, a driving signal is applied to the driving Tx2, Tx(n+2), Tx(2n+2) and Tx(3n+2), a signal is received by the sensing lines Rx1 and Rx2, and the driving lines Tx1, Tx3-Txn, Tx(n+1), Tx(n+3)-Tx2n, Tx(2n+1), Tx(2n+3)-Tx3n, Tx(3n+1) and Tx(3n+3)-Tx4n are all grounded. The similar operation may be performed until the driving signal is applied to the driving lines Txn, Tx2n, Tx3n and Tx4n.

Because the driving frequency is relatively high, e.g., dozens of MHz, it is able to form the complete fingerprint image by processing and splicing all the information received by the sensing sub-groups a when the touch operation has been made by the finger. It is able to acquire more fingerprint data during each scanning process, and it is merely necessary to collect the data fewer times so as to splice the collected data to form the fingerprint image. As a result, it is able to reduce the time desired for the scanning.

The present disclosure further provides in some embodiments a touch panel which includes the above-mentioned fingerprint identification device. According to the touch panel in the embodiments of the present disclosure, it is able to reduce the time desired for the fingerprint detection, thereby to perform the fingerprint identification more rapidly.

In the embodiments of the present disclosure, the fingerprint identification device includes a first substrate on which the first driving lines and the first sensing lines are arranged. The first substrate may be a part of a substrate of the touch panel, or the first substrate may be arranged on, and electrically connected to, the substrate of the touch panel. Here, the so-called "first substrate" and "substrate of the touch panel" may each be a glass substrate, a resin substrate or the like.

Figure 3:
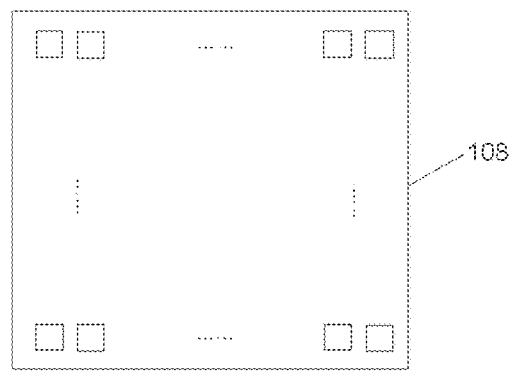
FIG. 3 is a schematic view showing a manufacture mode for the fingerprint identification device according to some embodiments of the present disclosure.

For example, as shown in FIG. 3, the fingerprint identification device includes a first substrate 108, and the blocks in FIG. 3 represent the fingerprint identification devices formed simultaneously. The first substrate 108 may then be cut into the fingerprint identification devices each in a single piece. Then, each fingerprint identification device may be arranged on the substrate of the touch panel through a chip-on-glass (COG) process, so as to reduce the production cost.

Figure 4:
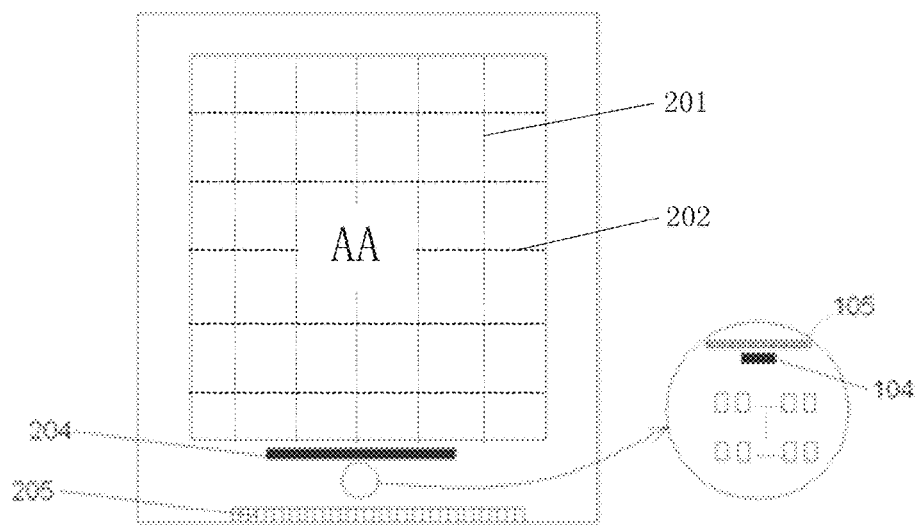
FIG. 4 is a schematic view showing a touch panel according to some embodiments of the present disclosure.

As shown in FIG. 4 which is a schematic view showing the touch panel, the circle represents the fingerprint identification device. As mentioned above, the fingerprint identification device includes the first driving IC 104 and the first binding region 105 configured to connect the fingerprint identification device to the first flexible circuit board. The first driving lines are electrically connected to the first driving IC 104, the first driving IC 104 is configured to apply a first driving signal to the first driving lines for the fingerprint identification, the first driving IC 104 is electrically connected to the first binding region 105, and the first sensing line is electrically connected to the first flexible circuit board through the first binding region 105.

The touch panel includes a second driving IC 204, a second binding region 205 connected to a second flexible circuit board, a plurality of second driving lines 201 and a plurality of second sensing lines 202. Here, the second driving lines 201 and the second sensing lines 202 cover a region AA of the touch panel, so as to achieve the touch detection.

The second driving lines are electrically connected to the second driving IC 204, the second driving IC 204 is configured to apply a second driving signal to the second driving lines 201 for the touch detection, the second driving IC 204 is electrically connected to the second binding region 205, and the second sensing lines 202 are electrically connected to the second flexible circuit board through the second binding region 205.

The first driving IC 104 is arranged independently of the second driving IC 204 and the first binding region 105 is arranged independently of the second binding region 205, or the first driving IC 104 is integrated into the second driving IC 204 and the first binding region 105 is integrated into the second binding region 205, so as to reduce the production cost.

The present disclosure further provides in some embodiments a display device which includes the above-mentioned touch panel. According to the display device in the embodiments of the present disclosure, it is able to reduce the time desired for the fingerprint detection, thereby to perform the fingerprint identification more rapidly.

It should be appreciated that, the above are merely the preferred embodiments of the present disclosure, and the present disclosure shall not be limited thereto. A person skilled in the art may make further modifications and improvements without departing from the spirit of the present disclosure, and these modifications and improvements shall also fall within the scope of the present disclosure.

What is claimed is:

1. A fingerprint identification device, comprising a plurality of first driving lines extending in a first predetermined direction and a plurality of first sensing lines extending in a second predetermined direction that is not parallel to the first predetermined direction,
    wherein the first sensing lines are divided into at least two sensing groups in the first predetermined direction, each sensing group comprises a plurality of sensing sub-groups arranged side by side in the second predetermined direction, each sensing sub-group comprises at least one of the first sensing lines, and the adjacent sensing sub-groups are insulated from each other,
    wherein a grounding line is (i) arranged between adjacent sensing groups and/or between the adjacent sensing sub-groups of each sensing group and (ii) insulated from the first sensing line, and
    wherein:
        the grounding line comprises a first extension portion, a second extension portion, and a third extension portion,
        the first extension portion extends in the first predetermined direction to a position between the adjacent sensing sub-groups of each sensing group,
        the second extension portion is located between the two sensing groups adjacent to each other in the first predetermined direction, extends in the second predetermined direction, and intersects the first extension portion, and
        the third extension portion is located between the two sensing groups adjacent to each other in the first predetermined direction, extends in the first predetermined direction, and intersects the second extension portion.

2. The fingerprint identification device according to claim 1, wherein the first predetermined direction is perpendicular to the second predetermined direction.

3. The fingerprint identification device according to claim 1, wherein each sensing sub-group comprises two of the first sensing lines forming a differential pair and configured to transmit signals in opposite directions.

4. The fingerprint identification device according to claim 1, wherein the first driving lines are evenly arranged outside the adjacent two sensing groups in the first predetermined direction.

5. The fingerprint identification device according to claim 1, further comprising a first driving integrated circuit (IC) and a first binding region configured to connect the fingerprint identification device to a first flexible circuit board, wherein the first driving lines are electrically connected to the first driving IC, the first driving IC is configured to apply a first driving signal to the first driving lines for the fingerprint identification, the first driving IC is electrically connected to the first binding region, and the first sensing line is electrically connected to the first flexible circuit board through the first binding region.

6. The fingerprint identification device according to claim 5, further comprising a first sensing IC electrically connected to the first sensing lines and configured to process sensing signals acquired by the first sensing lines so as to acquire fingerprint data.

7. The fingerprint identification device according to claim 6, wherein the first sensing IC is arranged on the first flexible circuit board.

8. The fingerprint identification device according to claim 6, wherein the first sensing IC is integrated into the first driving IC.

9. The fingerprint identification device according to claim 1, wherein the first sensing line is of a width greater than that of the first driving line.

10. The fingerprint identification device according to claim 9, wherein the first driving line is of a width in the range of 20 μm to 30 μm, the first sensing line is of a width in the range of 30 μm to 35 μm, and the first driving line is spaced apart from the adjacent first sensing line in the first predetermined direction at a distance in the range of 25 μm to 50 μm.

11. A touch panel, comprising the fingerprint identification device according to claim 1.

12. The touch panel according to claim 11, wherein the fingerprint identification device comprises a first substrate, on which first driving lines and first sensing lines are arranged, wherein the first substrate is a portion of a substrate of the touch panel, or the first substrate is arranged on, and electrically connected to, the substrate of the touch panel.

13. The touch panel according to claim 12, wherein:
the fingerprint identification device further comprises a first driving integrated circuit (IC) and a first binding region configured to connect the fingerprint identification device to a first flexible circuit board, wherein the first driving lines are electrically connected to the first driving IC, the first driving IC is configured to apply a first driving signal to the first driving lines for the fingerprint identification, the first driving IC is electrically connected to the first binding region, and the first sensing line is electrically connected to the first flexible circuit board through the first binding region; and
the touch panel comprises a second driving IC, a second binding region connected to a second flexible circuit board, a plurality of second driving lines and a plurality of second sensing lines, wherein the second driving lines are electrically connected to the second driving IC, the second driving IC is configured to apply a second driving signal to the second driving lines for the touch detection, the second driving IC is electrically connected to the second binding region, and the second sensing lines are electrically connected to the second flexible circuit board through the second binding region.

14. The touch panel according to claim 13, wherein the first driving IC is arranged independently of the second driving IC and the first binding region is arranged independently of the second binding region, or the first driving IC is integrated into the second driving IC and the first binding region is integrated into the second binding region.

15. A display device, comprising the touch panel according to claim 11.

16. The touch panel according to claim 11, wherein each sensing sub-group comprises two of the first sensing lines forming a differential pair and configured to transmit signals in opposite directions.

17. A fingerprint identification device, comprising:
a plurality of first driving lines extending in a first predetermined direction;
a plurality of first sensing lines extending in a second predetermined direction that is not parallel to the first predetermined direction; and
a first driving integrated circuit (IC) and a first binding region configured to connect the fingerprint identification device to a first flexible circuit board,
wherein the first sensing lines are divided into at least two sensing groups in the first predetermined direction, each sensing group comprises a plurality of sensing sub-groups arranged side by side in the second predetermined direction, each sensing sub-group comprises at least one of the first sensing lines, and the adjacent sensing sub-groups are insulated from each other, and
wherein the first driving lines are electrically connected to the first driving IC, the first driving IC is configured to apply a first driving signal to the first driving lines for the fingerprint identification, the first driving IC is electrically connected to the first binding region, and the first sensing line is electrically connected to the first flexible circuit board through the first binding region.

18. The fingerprint identification device according to claim 17, wherein a grounding line is arranged between the adjacent sensing groups and/or between the adjacent sensing sub-groups of each sensing group, and insulated from the first sensing line.

19. The fingerprint identification device according to claim 18, wherein the grounding line comprises a first extension portion, a second extension portion and a third extension portion; wherein
the first extension portion extends in the first predetermined direction to a position between the adjacent sensing sub-groups of each sensing group;
the second extension portion is located between the two sensing groups adjacent to each other in the first predetermined direction, extends in the second predetermined direction, and intersects the first extension portion; and
the third extension portion is located between the two sensing groups adjacent to each other in the first predetermined direction, extends in the first predetermined direction, and intersects the second extension portion.

20. A fingerprint identification device, comprising a plurality of first driving lines extending in a first predetermined direction and a plurality of first sensing lines extending in a second predetermined direction that is not parallel to the first predetermined direction, wherein the first sensing lines are divided into at least two sensing groups in the first predetermined direction, each sensing group comprises a plurality of sensing sub-groups arranged side by side in the second predetermined direction, each sensing sub-group comprises at least one of the first sensing lines, and the adjacent sensing sub-groups are insulated from each other,
wherein the first sensing line is of a width greater than that of the first driving line, and
wherein the first driving line is of a width in the range of 20 μm to 30 μm, the first sensing line is of a width in the range of 30 μm to 35 μm, and the first driving line is spaced apart from the adjacent first sensing line in the first predetermined direction at a distance in the range of 25 μm to 50 μm.

* * * * *